US010880945B2

(12) United States Patent
Kanzaki et al.

(10) Patent No.: US 10,880,945 B2
(45) Date of Patent: Dec. 29, 2020

(54) SYSTEM FOR CONTROLLING MOBILE DEVICE, CONTROL DEVICE, AND CONTROL METHOD

(71) Applicant: Hitachi, Ltd., Tokyo (JP)

(72) Inventors: Hajime Kanzaki, Tokyo (JP); Daisuke Ishii, Tokyo (JP); Toshiyuki Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/331,654

(22) PCT Filed: Nov. 9, 2016

(86) PCT No.: PCT/JP2016/083222
§ 371 (c)(1),
(2) Date: Mar. 8, 2019

(87) PCT Pub. No.: WO2018/087835
PCT Pub. Date: May 17, 2018

(65) Prior Publication Data
US 2019/0246444 A1 Aug. 8, 2019

(51) Int. Cl.
H04W 76/18 (2018.01)
H04W 4/70 (2018.01)
(Continued)

(52) U.S. Cl.
CPC .......... H04W 76/18 (2018.02); H04L 67/125 (2013.01); H04L 69/40 (2013.01); H04W 4/30 (2018.02);
(Continued)

(58) Field of Classification Search
CPC combination set(s) only.
See application file for complete search history.

(56) References Cited

U.S. PATENT DOCUMENTS 7,343,267 B1 * 3/2008 Casler et al.
8,514,702 B2 * 8/2013 Tanigawa et al.
(Continued)

FOREIGN PATENT DOCUMENTS

JP 2012231238 A 11/2012
JP 2016119616 A 6/2016

OTHER PUBLICATIONS

International Search Report of PCT/JP2016/083222 dated Jan. 31, 2017.

Primary Examiner — Andrew Lai
Assistant Examiner — Mohammed M Murshid
(74) Attorney, Agent, or Firm — Mattingly & Malur, PC

(57) ABSTRACT

A gateway device is wirelessly connected to a mobile device and a control device that is connected to the gateway device and controls the mobile device. The mobile device reports a completion report indicating completion of a movement work according to a movement control instruction from the control device, and wherein the control device includes a work control unit that transmits the movement control instruction to the mobile device. It is determined whether or not a failure has occurred in communication between the control device and the gateway device, and it is determined whether or not the movement control instruction executed by the mobile device passes through the gateway device in which the failure determined by the failure detection unit has occurred, and stops transmission of the movement control instruction of passing through the gateway device in which the failure has occurred to the mobile device.

12 Claims, 15 Drawing Sheets

(51) Int. Cl.

| | |
|---|---|
| *H04W 88/16* | (2009.01) |
| *H04L 29/14* | (2006.01) |
| *H04W 36/32* | (2009.01) |
| *H04W 4/30* | (2018.01) |
| *H04L 29/08* | (2006.01) |
| *H04W 4/80* | (2018.01) |
| *H04W 4/44* | (2018.01) |
| *H04W 76/19* | (2018.01) |

(52) U.S. Cl.
CPC ............... *H04W 4/44* (2018.02); *H04W 4/70* (2018.02); *H04W 4/80* (2018.02); *H04W 36/32* (2013.01); *H04W 88/16* (2013.01); *H04W 76/19* (2018.02)

(56) References Cited

U.S. PATENT DOCUMENTS

| | | | |
|---|---|---|---|
| 9,210,596 B1* | 12/2015 | Chen | .................... H04W 76/19 |
| 2013/0094414 A1* | 4/2013 | Park et al. | |
| 2016/0157091 A1* | 6/2016 | Wu | ........................ H04W 8/24 |
| | | | 370/329 |
| 2016/0277413 A1* | 9/2016 | Ajitomi et al. | |

* cited by examiner

[FIG. 1]
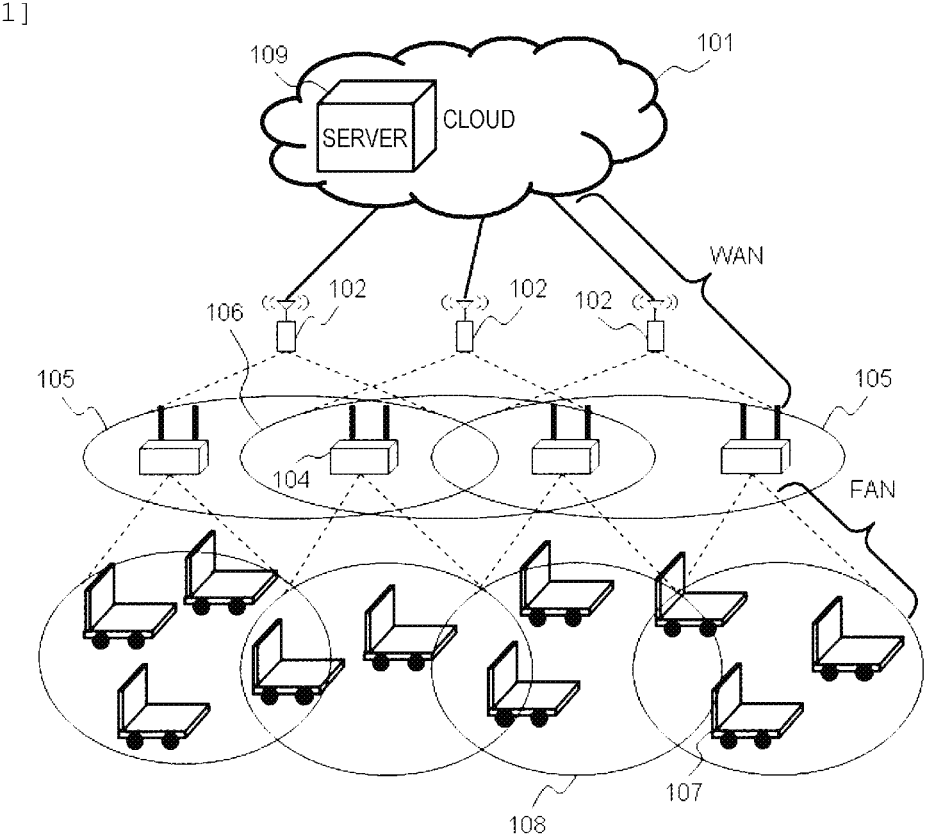

[FIG. 2]
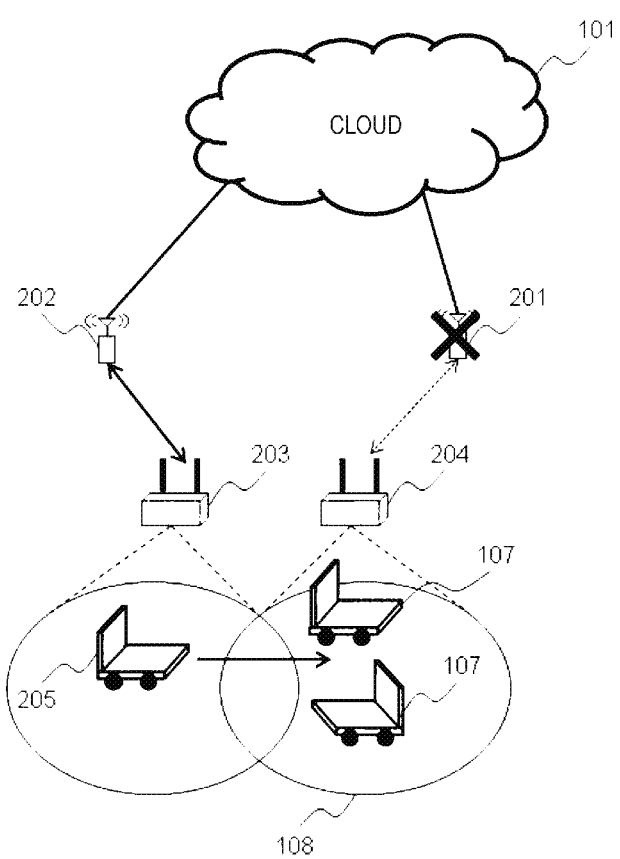

[FIG. 3]
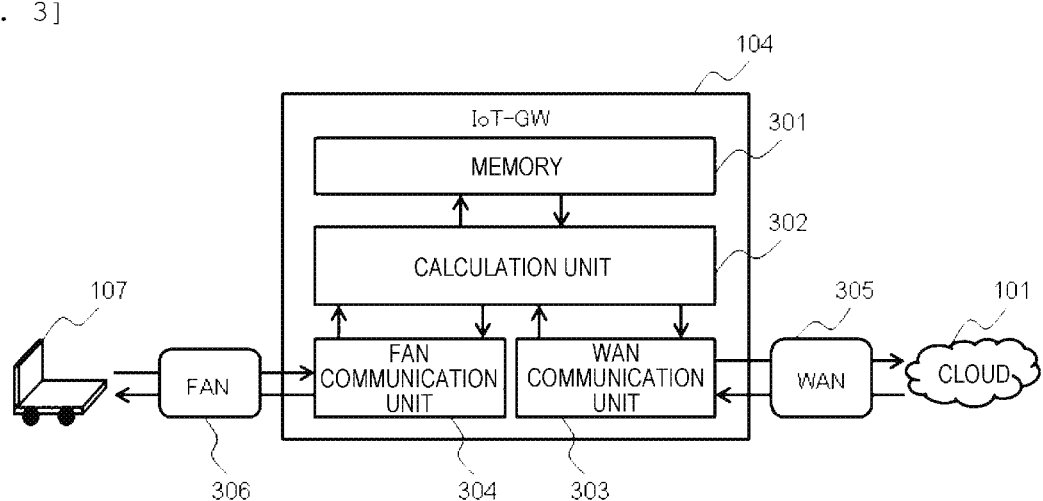

[FIG. 4]
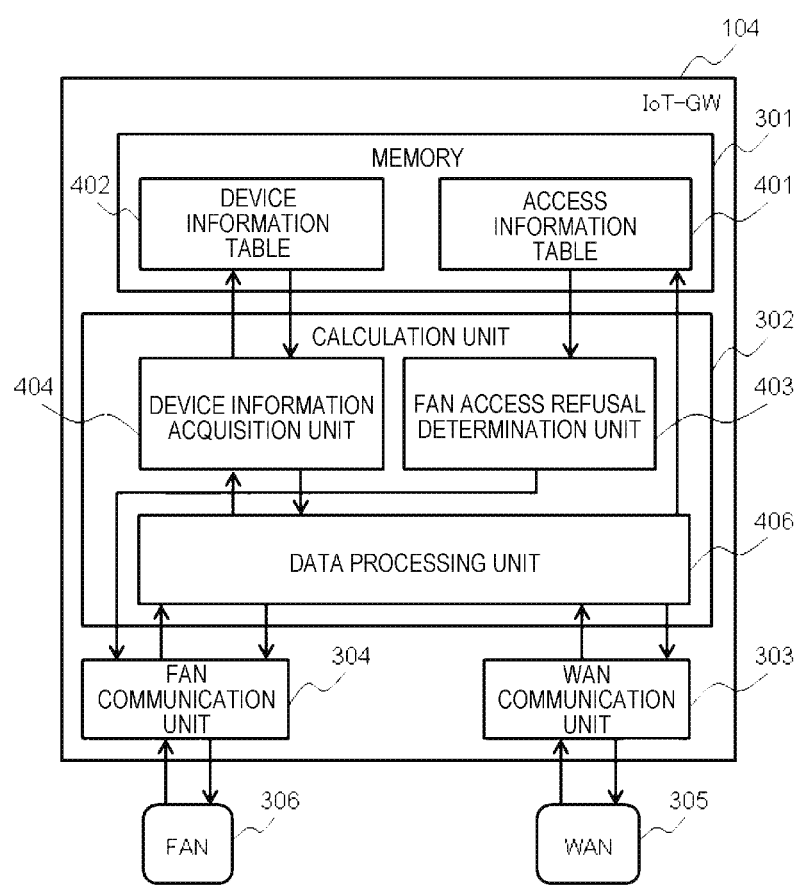

[FIG. 5]
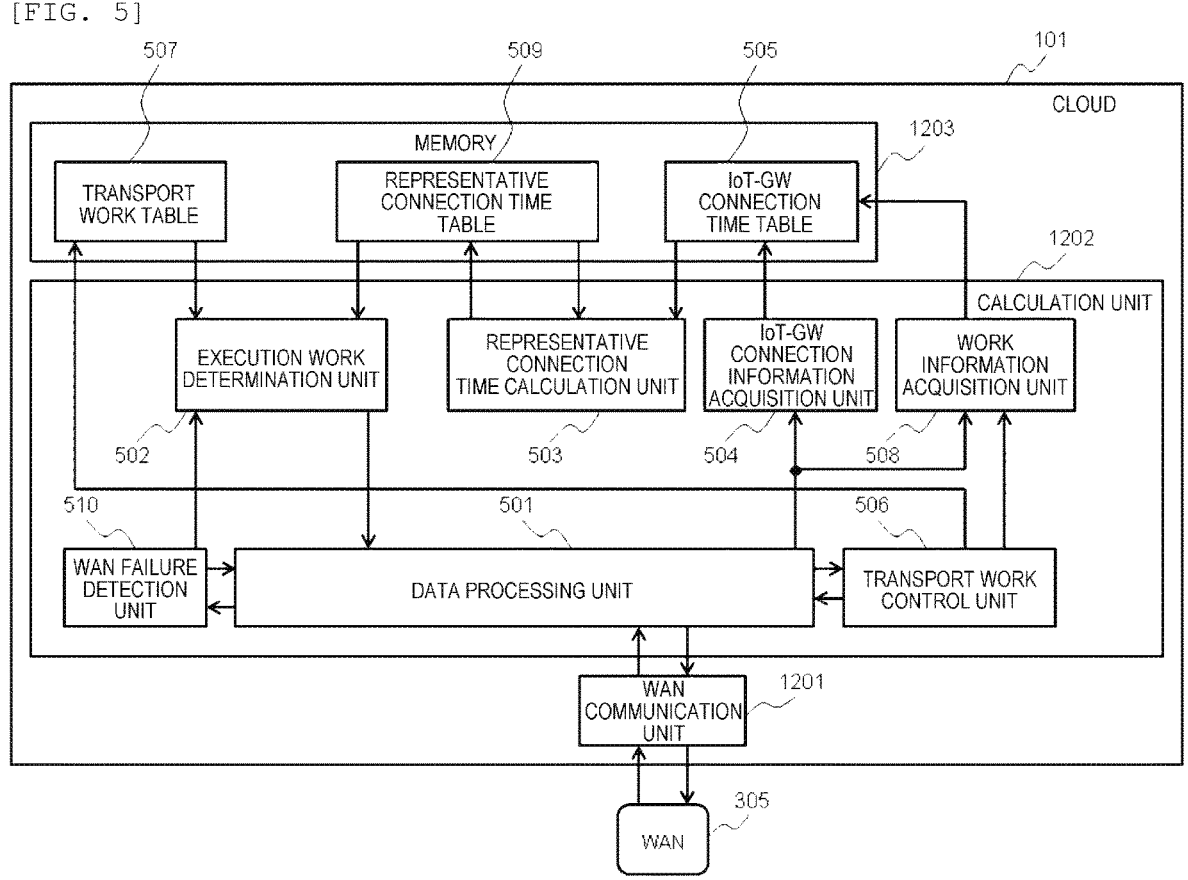

[FIG. 6]
| DEVICE ID | IoT-GW ID | TRANSPORT WORK ID | CONNECTION TIME | DISCONNECTION TIME | TRANSPORT START TIME | TRANSPORT COMPLETION TIME |
|---|---|---|---|---|---|---|
| D_1 | 3 | 3 | | 09:13:13.54 | 09:13:01.03 | |
| D_2 | 2 | 3 | 08:12:55.78 | | | 08:13:13.71 |
| ⋮ | ⋮ | ⋮ | ⋮ | ⋮ | ⋮ | ⋮ |
| D_M | 8 | 13 | | | 10:03:48.58 | 10:02:56.08 |
IoT-GW CONNECTION TIME TABLE
[FIG. 7]
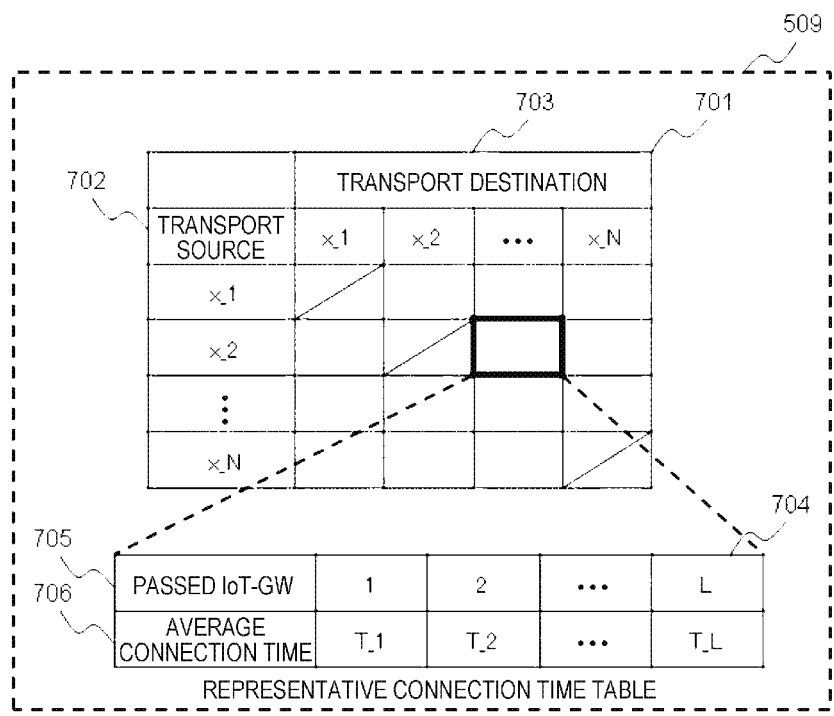

[FIG. 8]
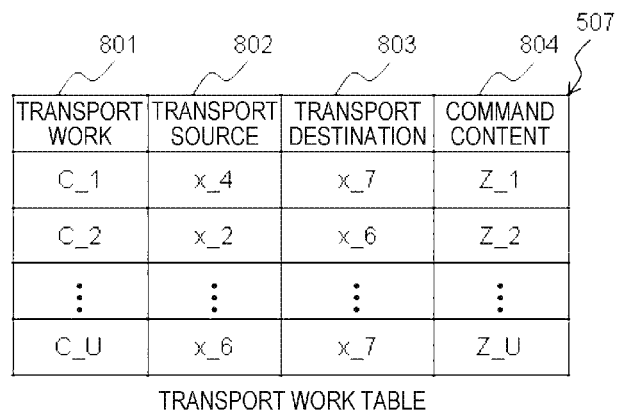
TRANSPORT WORK TABLE
[FIG. 9]
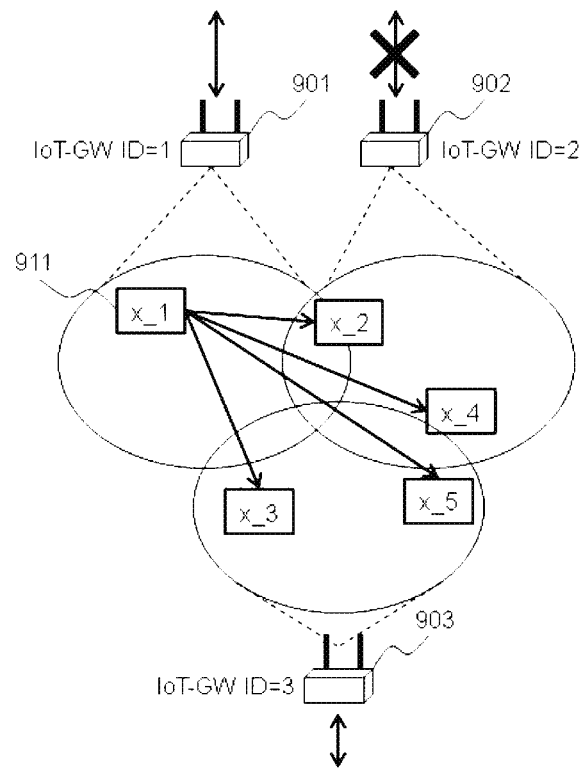

[FIG. 10]
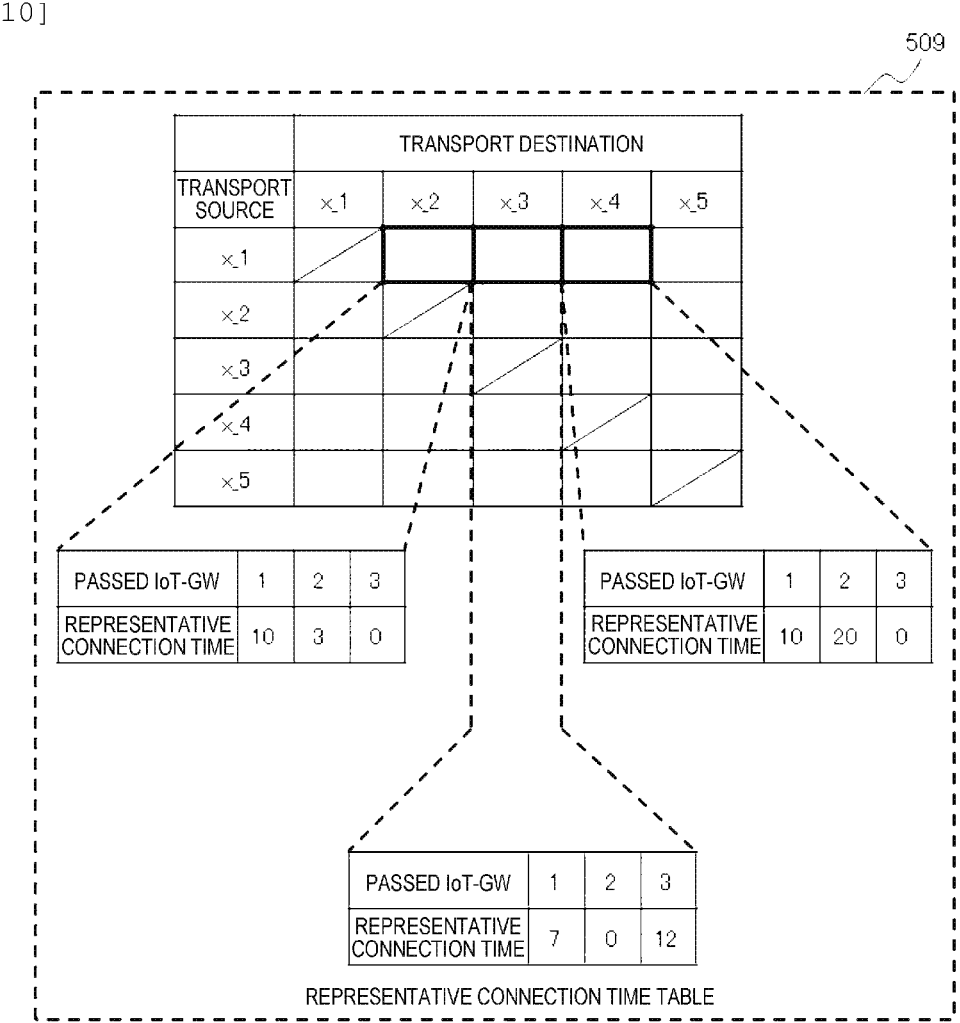

[FIG. 11]
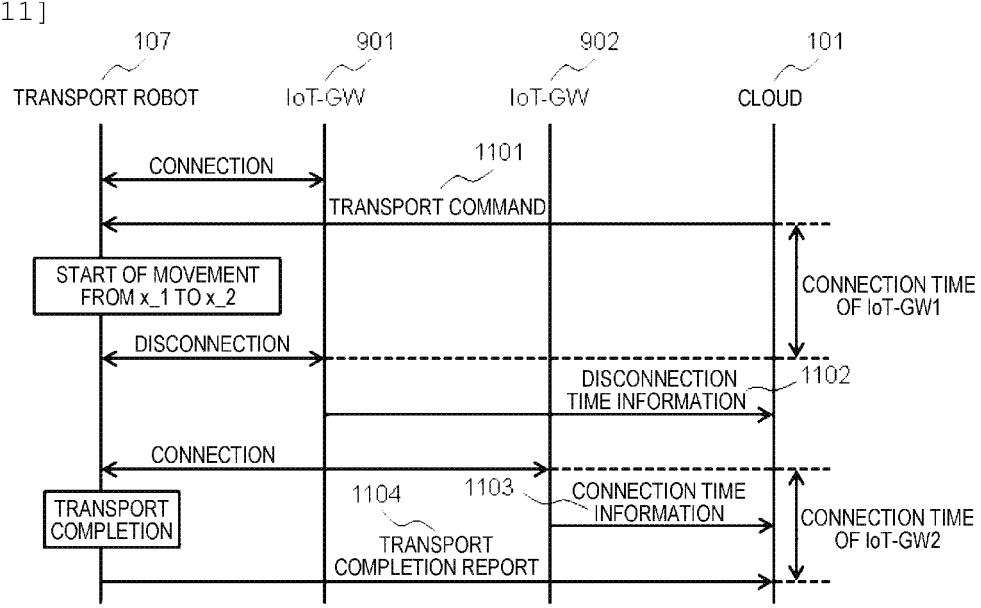
[FIG. 12]
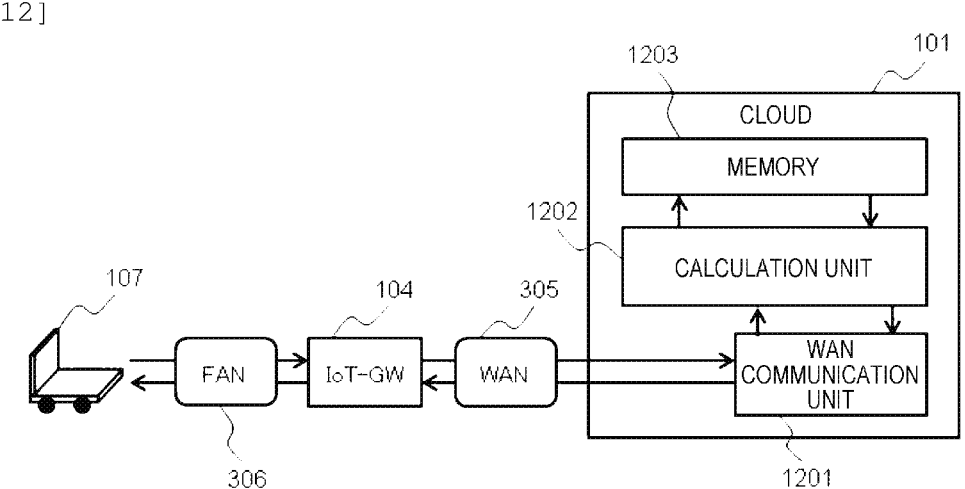

[FIG. 13]
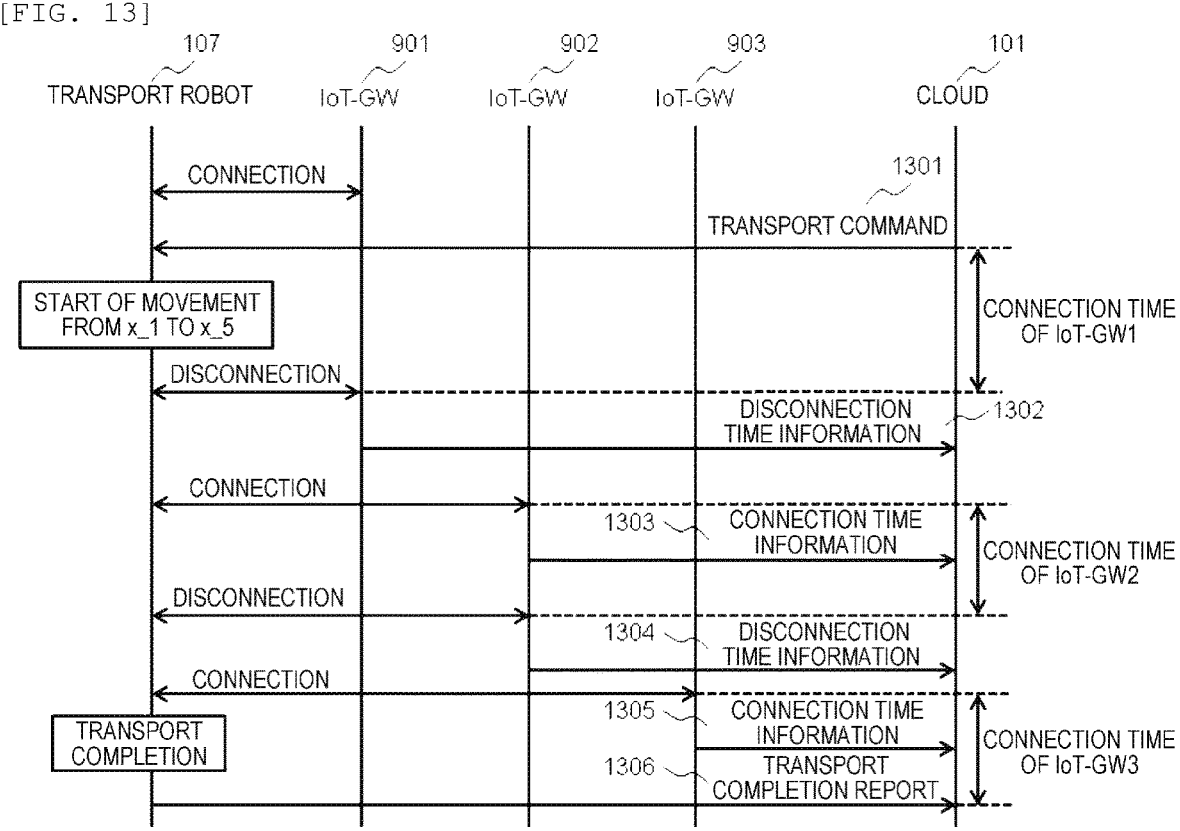

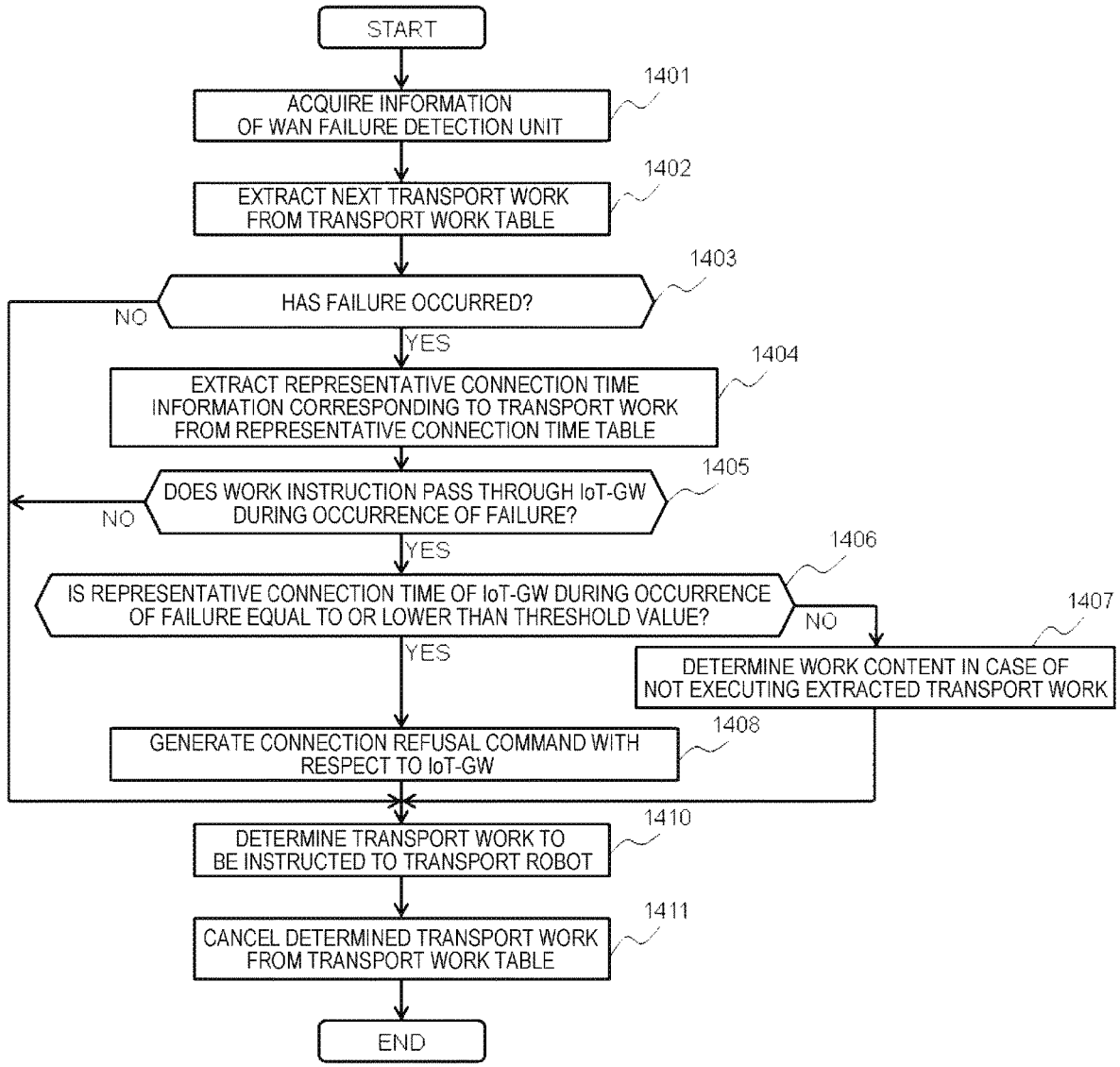

[FIG. 15]

| DEVICE ID | CONNECTION REFUSAL TIME |
|---|---|
| D_1 | 3.2 |
| D_2 | 0 |
| ⋮ | ⋮ |
| D_M | 1.8 |

ACCESS INFORMATION TABLE

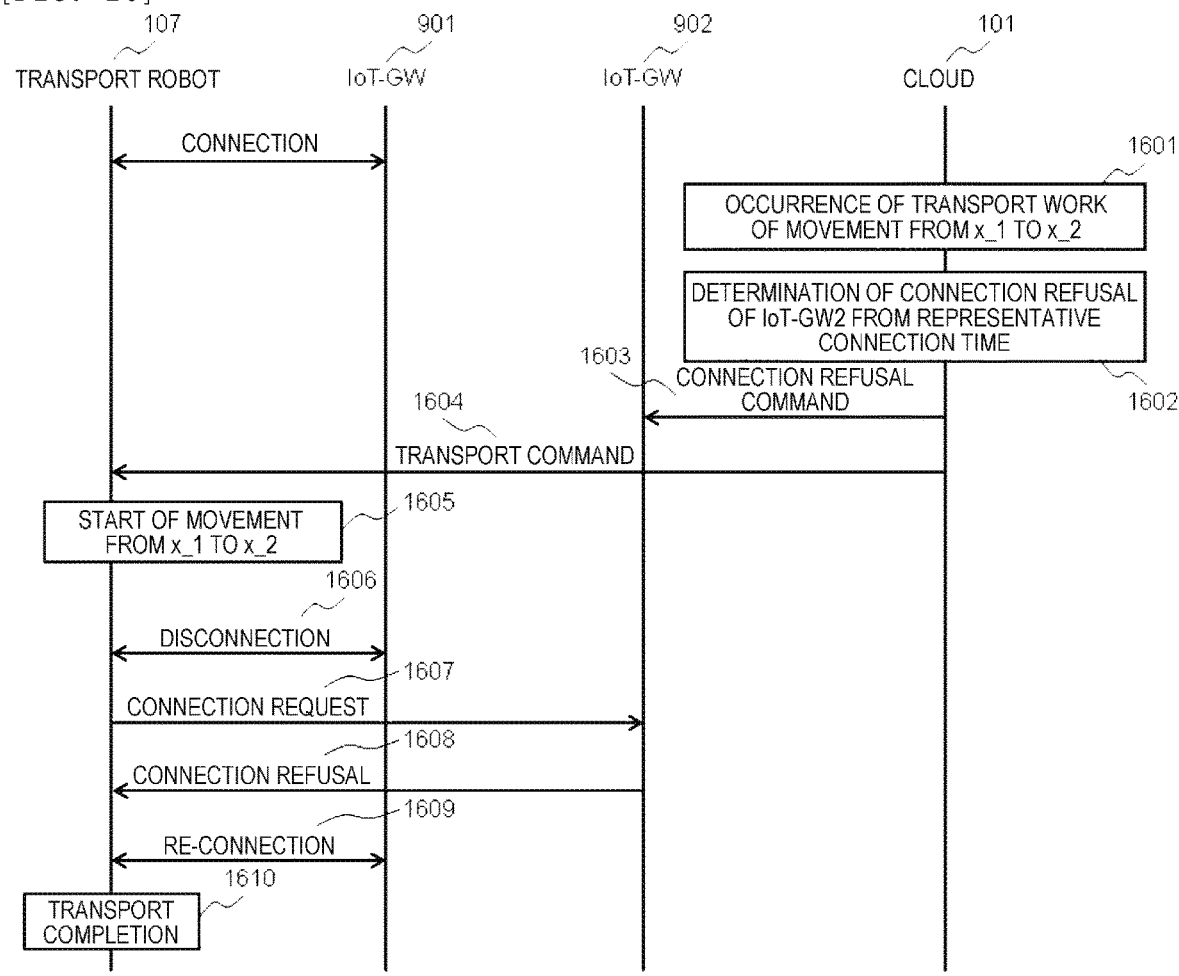

[FIG. 17]
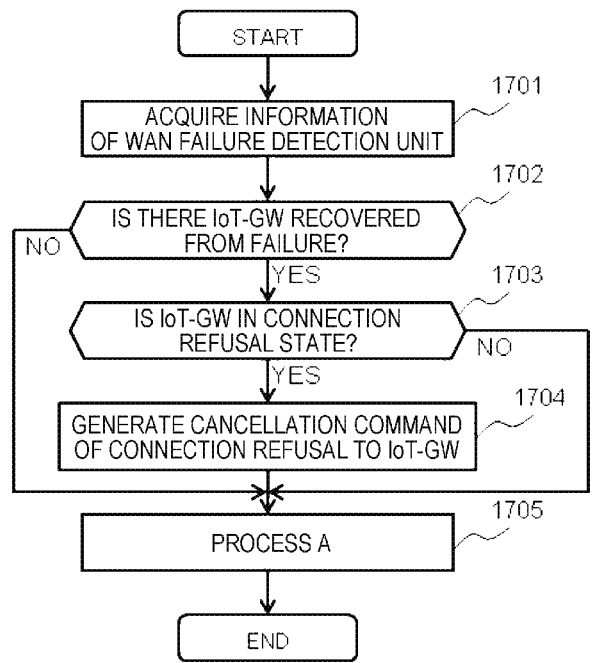

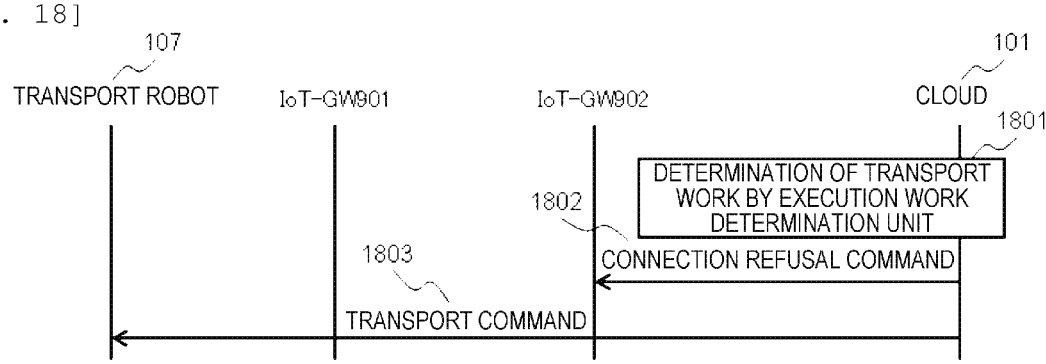

SYSTEM FOR CONTROLLING MOBILE DEVICE, CONTROL DEVICE, AND CONTROL METHOD

TECHNICAL FIELD

The present invention relates to a system for controlling a mobile device.

BACKGROUND ART

Introduction of IoT (Internet of Things) technology is progressing in order to improve production efficiency of a factory. Through realization of the IoT of the factory, various factory apparatuses and clouds are connected via a network, and thus, instructions can be transmitted from the cloud to factory machines. Recently, in a manufacturing field of the factory, the production of many types has increased, and the line production has been replaced with cell production. In order to efficiently perform cell produce, it is necessary to efficiently transport the material by the automatic transport robot.

In the case of controlling an automatic transport robot with an IoT system, a wireless network is used as a FAN (field area network) in a factory field, and a WAN (wide area network) is used to connect a factory and a cloud, so that the automatic transport robot can be controlled from the cloud. An IoT-GW (Gateway) relaying the FAN and the WAN is installed in the factory. The IoT-GW collects information of the field apparatuses via the FAN and transmits the information to the cloud via the WAN. In addition, the information transmitted from the cloud via the WAN is transmitted to the field apparatuses (such as automatic transport robots) via the FAN. For this reason, when a failure has occurred in the WAN connecting the factory and the cloud, the transport of parts is stopped or slowed down, and thus, the production efficiency of the factory decreases.

As a background art in this technical field, there are the following cited literatures. PTL 1 (JP-A-2016-119616) discloses a ring-type network system in which stations of a master station and a plurality of slave stations are daisy-chain-connected to form a ring-shaped network, and in a group of the daisy-chain-connected stations, the stations at both ends are daisy-chain-connected. In this configuration, the master station allows both or one of two loop-back control units of the master station to be forcibly in a loop-back state at the time of rise or the like. Thus, a ring-type network system is disclosed in which, during operation or at the time of disconnection, the loop-back control unit cancels this forced loop-back state at the time of detection of the disconnection.

In addition, PTL 2 (JP-A-2012-231238) discloses a base station including a congestion state determination unit that determines whether or not the base station is in a congestion state, a connection request signal transmittable time setting unit that shortens a connection request signal transmittable time indicating a period of time during which a connection request signal can be re-transmitted to a user terminal in a case where it is determined that the base station is in the congestion state, a re-transmission timing parameter setting unit that sets a re-transmission timing parameter indicating a time range to be used at the time of setting a re-transmission timing of a random access preamble to a large value in a case where it is determined that the base station is in the congestion state, and a transmission unit that transmits the connection request signal transmittable time and the re-transmission timing parameter.

CITATION LIST

Patent Literature

PTL 1: JP-A-2016-119616
PTL 2: JP-A-2012-231238

SUMMARY OF INVENTION

Technical Problem

According to PTL 1, by shifting to a fee plan for such low-speed communication at the time of occurrence of congestion, some users can maintain communication of each user without occupying the network line, but in such low-speed communication, control messages are stagnated, and thus, the robot is slowed down. According to PTL 2, although the connection request signal is re-transmitted in order to improve a decrease in the connection rate at the time of occurrence of the congestion, since the communication quality after connection decreases, the environment of the communication between the factory and the cloud cannot be improved.

When a WAN failure has occurred, a field apparatus as a subordinate of the IoT-GW connected to the WAN is affected. Since the subordinate of the IoT-GW in which no failure has occurred can perform the communication as usual, a normal work (for example, a transport of goods by the transport robot) can be performed. However, when the transport robot moves to the subordinate of the IoT-GW in which the failure has occurred, the communication quality deteriorates, so that the signal from the cloud is stopped or is delayed, and thus, the transport robot is stopped or slowed down. Since the cloud does not know the area of the IoT-GW through which the transport robot that received the transport instruction passes, an event may occur in which the transport robot moves to the subordinate of the IoT-GW in which the failure has occurred and the robot is stopped or slowed down.

When such an event occurs, the transport robot gathers to the subordinate of the IoT-GW in which the failure has occurred, which also affects a transport work of parts in the area in which no failure has occurred. On the other hand, as the transport work, there are a transport of passing through the communication area (failure area) of the IoT-GW in which the failure has occurred and a transport of not passing through the communication area, and furthermore, there are a transport of passing through the failure area and moving to a location close to the failure non-occurrence area and a transport of moving to a location far from the failure non-occurrence area.

An object of the present invention is to reduce an influence of a failure area and to suppress a decrease in work efficiency of field apparatuses.

Solution to Problem

A representative example of the invention disclosed in this application is as follows. That is, a system for controlling a mobile device includes a gateway device that is wirelessly connected to the mobile device and a control device that is connected to the gateway device and controls the mobile device, wherein the mobile device reports a completion report indicating completion of a movement work according to a movement control instruction from the control device to the control device, and wherein the control device includes a work control unit that transmits the movement control instruction to the mobile device, a failure detection unit that determines whether or not a failure has occurred in communication between the control device and the gateway device, and a work determination unit that determines whether or not the movement control instruction executed by the mobile device passes through the gateway device in which the failure determined by the failure detection unit has occurred and stops transmission of the movement control instruction of passing through the gateway device in which the failure has occurred to the mobile device.

Advantageous Effects of Invention

According to one aspect of the present invention, it is possible to minimize the influence of a failure area. The problems, configurations, and effects other than those described above will be clarified from the description of the embodiments below.

BRIEF DESCRIPTION OF DRAWINGS

FIG. 1 is a diagram illustrating a configuration of a system according to Embodiment 1.

FIG. 2 is a diagram illustrating a concept in a case where a WAN failure has occurred in the configuration of the system according to Embodiment 1.

FIG. 3 is a diagram illustrating a configuration of an IoT-GW according to Embodiment 1.

FIG. 4 is a functional block diagram of the IoT-GW according to Embodiment 1.

FIG. 5 is a functional block diagram of a cloud according to Embodiment 1.

FIG. 6 is a diagram illustrating a configuration example of an IoT-GW connection time table according to Embodiment 1.

FIG. 7 is a diagram illustrating a configuration example of a representative connection time table according to Embodiment 1.

FIG. 8 is a diagram illustrating a configuration example of a transport work table according to Embodiment 1.

FIG. 9 is a diagram illustrating an example of a transport work passing through an IoT-GW in which the failure has occurred in Embodiment 1.

FIG. 10 is a diagram illustrating an example of a representative connection time table in FIG. 9 according to Embodiment 1.

FIG. 11 is a diagram illustrating a transport work from x_1 to x_2 in FIG. 9 according to Embodiment 1.

FIG. 12 is a diagram illustrating a configuration of a cloud according to Embodiment 1.

FIG. 13 is a diagram illustrating a transport work from x_1 to x_5 in FIG. 9 according to Embodiment 1.

FIG. 14 is a flowchart of a process A (step 1705) according to Embodiment 1.

FIG. 15 is a diagram illustrating a configuration example of an access information table according to Embodiment 1.

FIG. 16 is a sequence diagram at the time of refusing connection according to Embodiment 1.

FIG. 17 is a flowchart of a process executed by an execution work determination unit according to Embodiment 1.

FIG. 18 is a diagram illustrating a sequence after the execution work determination unit according to Embodiment 1 has determined a transport work.

FIG. 19 is a diagram illustrating a configuration example of a device information table according to Embodiment 1.

DESCRIPTION OF EMBODIMENTS

Embodiment 1

Hereinafter, a wireless communication system according to Embodiment 1 and a base station in the wireless communication system will be described in detail with reference to the drawings.

FIG. 1 is a diagram illustrating a configuration of the system according to Embodiment 1.

A cloud 101 is connected to an IoT-GW 104 via a WAN (Wide Area Network). In the cloud 101, a server 109 which is a computer for performing various processes is provided, and the processing in the cloud described below is executed by the server 109. In a case where a cellular network is used for the WAN, the IoT-GW 104 is provided in a communication area 105 of a wireless base station 102, and the wireless base station 102 is connected to the cloud 101 by a wired network or the like. However, the WAN is not a cellular network, but the WAN may be a network (for example, a wired network such as an optical fiber or a dedicated line) connecting the cloud 101 and the IoT-GW 104.

The IoT-GW 104 has a FAN (Field Area Network) interface for wireless communication and provides a communication area 108. A transport robot 107 is connected to the IoT-GW via the FAN according to the communication area of each IoT-GW. As the FAN, various wireless communication systems such as Zigbee, WiFi, and Bluetooth can be used, but any network may be used as long as the network connects the IoT-GW 104 and the transport robot 107 wirelessly. In addition, in this embodiment, the transport robot 107 is exemplified as a moving work machine, but other machines may be used as long as these machines are work machines that move to destinations set within a specific area.

FIG. 3 is a diagram illustrating the configuration of the IoT-GW 104 according to Embodiment 1.

The IoT-GW 104 includes a FAN communication unit 304 for communicating with the transport robot 107, a WAN communication unit 303 for communicating with the cloud 101, a calculation unit 302 for performing various processes, and a memory 301 storing a program and data (various tables) used by the program.

FIG. 12 is a diagram illustrating a configuration of the cloud 101 according to Embodiment 1.

As illustrated in FIG. 1, one or more servers 109 are provided in the cloud 101. As illustrated in FIG. 12, the cloud 101 includes a WAN communication unit 1201 for communicating with the IoT-GW 104, a calculation unit 1202 for performing various processes, and a memory 1203 for storing a program main body and various tables.

The calculation unit 1202 executes the program stored in the memory 1203. The memory 1203 includes a ROM which is a nonvolatile storage element and a RAM which is a volatile storage element. The ROM stores an invariable program (for example, BIOS) and the like. The RAM is a high-speed, volatile storage element such as a DRAM (Dynamic Random. Access Memory) and temporarily stores a program to be executed by the calculation unit 1202 and data to be used at the time of execution of the program.

The cloud 101 (server 109) may have an auxiliary storage device. The auxiliary storage device is a large-capacity, nonvolatile storage device such as a magnetic storage device (HDD), a flash memory (SSD), or the like and stores programs to be executed by the calculation unit 1202 and data used at the time of execution of the program. That is, the program is read out from the auxiliary storage device, loaded in the memory 1203, and executed by the calculation unit 1202.

The WAN communication unit 1201 is a network interface device that controls communication with another device (IoT-GW 104 or the like) according to a predetermined protocol.

The program executed by the calculation unit 1202 is provided to a meeting place recommendation server 1 via a removable medium (CD-ROM, flash memory, and the like) or a network and is stored in a nonvolatile auxiliary storage device which is a non-temporary storage medium. For this reason, the server 109 may have an interface for reading data from the removable medium.

FIG. 2 is a diagram illustrating a concept in a case where a WAN failure has occurred in the configuration of the system according to Embodiment 1.

In a case where a WAN failure has occurred in the base station 201, the communication quality of the IoT-GW 204 as a subordinate of the base station 201 deteriorates and a delay occurs. When the communication quality of the IoT-GW 204 deteriorates, the transport robot 107 in the communication area 108 as a subordinate of the IoT-GW is affected, the transport command from the cloud 101 is delayed or stopped, and the transport work is stopped or slowed down.

On the other hand, in the IoT-GW 203 as a subordinate of the base station 202 in which a WAN failure has not occurred, there is no influence of the WAN failure, and a normal transport command can be transmitted as it is. However, when the transport robot 205 as a subordinate of the IoT-GW 203 moves to the communication area 108 of the IoT-GW 204 in which a failure has occurred, the communication with the cloud 101 is hindered, and the transport work is stopped or slowed down.

Hereinafter, the communication area of the IoT-GW in which the failure has occurred is referred to as a failure area, and the communication area of the IoT-GW in which no failure has occurred is referred to as a failure non-occurrence area.

In Embodiment 1, from a representative value (representative connection time) of the connection time with each IoT-GW 204 of the transport robot 107, it is estimated whether or not the transport command from the cloud 101 passes through the failure area or whether or not there is a failure non-occurrence area in the vicinity of the failure area. Then, the cloud 101 determines whether or not to change the transport command or whether or not to refuse the connection from the transport robot 107 to the IoT-GW 204 in which a failure has occurred.

In order to measure the representative connection time of the transport robot in the cloud 101, the IoT-GWs 203 and 204 measure the time and notify the cloud 101 of the time at the time of connection and disconnection of each transport robot 107 to and from each of the IoT-GWs 203 and 204.

In the following, as illustrated in FIG. 9, the definition of the connection time will be described by taking as an example the case where three IoT-GWs 901, 902, and 903 exist and a failure occurs in the WAN of the IoT-GW 902. In addition, ID is set in each IoT-GW, the ID of IoT-GW 901 is set to 1, the ID of IoT-GW 902 is set to 2, and the ID of IoT-GW 903 is set to 3. The transport robot 911 is currently located at the location x_1. In addition, x_2, x_3, x_4, and x_5 indicate locations where the transport robot 911 can move.

In general, in many cases, a work of moving to a specified destination within a specific range, such as a transport work, may be a work at the same starting position and destination in the past. Therefore, the representative connection time is calculated from information of moving by receiving the same command in the past, and the representative connection time is used for determination in the case of executing a transport command after the occurrence of a failure from the representative connection time.

FIG. 11 is a diagram illustrating a transport work from x_1 to x_2, and is a diagram illustrating a calculation method of the connection time in the transport work.

After the connection to the IoT-GW 901, the transport robot 107 receives a transport command 1101 from the cloud 101. Upon receiving the transport command 1101, the transport robot 107 starts movement from x_1 to x_2.

Since the transport robot 107 is out of the communication range of the IoT-GW 901 and falls within the communication range of the IoT-GW 902 due to the movement from x_1 to x_2, the transport robot 107 is disconnected from the IoT-GW 901 and connected to the IoT-GW 902.

After the disconnection from the transport robot 107, the IoT-GW 901 notifies the cloud 101 of a disconnection time information 1102 including the disconnection time. In addition, the IoT-GW 902 notifies the cloud 101 of the connection time information 1103.

After connection to the IoT-GW 902, when transport is completed, the transport robot 107 notifies the cloud 101 of a transport completion report 1104.

The cloud 101 determines that the time difference between the transport command 1101 and the disconnection time information 1102 is the connection time of the IoT-GW 901. The time of the transport command 1101 may be the time at which the cloud 101 transmitted the transport command or may be the time at which the IoT-GW 901 or the transport robot 107 received the transport command 1101 (for example, the time is included in the reception confirmation (not illustrated) of the transport command 1101 and is returned to the cloud 101).

In addition, the cloud 101 determines that the time difference between the connection time information 1103 and the transport completion report 1104 is the connection time of the IoT-GW 902. The time of the transport completion report 1104 may be the time at which the cloud 101 received the transport completion report 1104 or the time at which the transport robot 107 completed the transport.

In this manner, the cloud 101 acquires the connection time, which is a period of time when the transport command is being executed during the connection between the transport robot 107 and the IoT-GW. Then, the cloud 101 performs statistical processing (for example, averaging) on the past connection times calculated with respect to the same type of transport command and calculates the representative connection time.

However, the method of calculating the representative connection time is not limited to averaging, and the representative connection time may be calculated by other statistical processing such as a maximum value, a minimum value, and a median value.

Similarly, referring to FIG. 13, a method of calculating the connection time in the case of moving from x_1 to x_5 will be described.

As illustrated in FIG. 9, in the case of moving from x_1 to x_5, the transport robot 107 switches connection in the order of the IoT-GW 901, the IoT-GW 902, and the IoT-GW 903 and moves.

After the connection to the IoT-GW 901, the transport robot 107 receives the transport command 1301 from the cloud 101. Upon receiving the transport command 1301, the transport robot 107 starts moving from x_1 to x_5.

Since the transport robot 107 is out of the communication range of the IoT-GW 901 and falls within the communication range of the IoT-GW 902 during the movement from x_1 to x_5, the transport robot 107 is disconnected from the IoT-GW 901 and connected to the IoT-GW 902.

After the disconnection from the transport robot 107, the IoT-GW 901 notifies the cloud 101 of the disconnection time information 1302. In addition, the IoT-GW 902 notifies the cloud 101 of the connection time information 1303.

In addition, since the transport robot 107 is out of the communication range of the IoT-GW 902 and falls within the communication range of the IoT-GW 903, the transport robot 107 is disconnected from the IoT-GW 902 and connected to the IoT-GW 903.

After the disconnection from the transport robot 107, the IoT-GW 902 notifies the cloud 101 of the disconnection time information 1304. In addition, the IoT-GW 903 notifies the cloud 101 of the connection time information 1305.

After the connection to the IoT-GW 903, when the transport is completed, the transport robot 107 notifies the cloud 101 of the transport completion report 1306.

The cloud 101 determines that the time difference between the transport command 1301 and the disconnection time information 1302 is a connection time of the IoT-GW 901. The time of the transport command 1301 may be the time at which the cloud 101 transmitted the transport command or may be the time at which the IoT-GW 901 or the transport robot 107 received the transport command 1301 (for example, the time is included in the reception confirmation (not illustrated) of the transport command 1301 and is returned to the cloud 101).

In addition, the cloud 101 determines that the time difference between the connection time information 1303 and the disconnection time information 1304 is a connection time of the IoT-GW 902. In addition, the cloud 101 determines that the time difference between the connection time information 1305 and the transport completion report 1306 is a connection time of the IoT-GW 903. The time of the transport completion report 1306 may be the time at which the cloud 101 received the transport completion report 1306 or the time at which the transport robot 107 completed the transport.

In this manner, the cloud 101 acquires the connection time, which is a period of time when the transport command is being executed during the connection between the transport robot 107 and the IoT-GW. Then, the cloud 101 performs statistical processing on the past connection times calculated with respect to the same type of transport command and calculates the representative connection time.

FIG. 10 is a diagram illustrating an example of a representative connection time table 509 in the case of moving from x_1 to x_2, x_3, and x_4.

In a case where the transport robot 107 moves from x_1 to x_2, since the transport robot 107 does not pass through the IoT-GW 903, the representative connection time of the IoT-GW 3 is zero. In a case where the transport robot moves from x_1 to x_3, since the transport robot does not pass through the IoT-GW 902, the representative connection time of the IoT-GW 902 is zero. In a case where the transport robot moves from x_1 to x_4, since the transport robot does not pass through the IoT-GW 3, the representative connection time of the IoT-GW 3 is zero. In addition, although not illustrated, in a case where the transport robot moves from x_1 to x_5, since the transport robot passes all the IoT-GWs, there is no point where the representative connection time is zero.

As described above, in the cloud 101, in a case where the IoT-GW where the transport command is started and the IoT-GW which is the destination are the same, the time difference between the transport command and the transport completion report becomes the connection time. On the other hand, in a case where the IoT-GW where the transport command is started and the IoT-GW which is the destination are different, the time difference between the transport command and the disconnection time information in the IoT-GW where the transport command is started becomes the connection time, the time difference between the connection time information and the transport completion report in the IoT-GW which is the destination becomes the connection time, and the time difference between the connection time information and the disconnection time information in the IoT-GW where the transport command is not started and which is not the destination becomes the connection time. In addition, the transport command may be any command for allowing the transport robot 107 to start moving, and the transport completion report may be any information of a report that the transport robot 107 has completed the movement.

FIG. 5 is a functional block diagram illustrating operations using the representative connection information described above in the cloud 101 according to Embodiment 1.

A transport work control unit 506 communicates with the transport robot 107 and controls each transport work. Various methods can be applied as a method of determining the transport work in the transport work control unit 506. The transport work control unit 506 transmits a final transport work command determined by an execution work determination unit 502 to the transport robot 107.

The transport work determined by the transport work control unit 506 is stored in a transport work table 507. As illustrated in FIG. 8, the transport work table 507 includes ID information 801 of the transport work, location information 802 of the transport source, location information 803 of the transport destination, and a command content 804 indicating a specific work content. The ID information 801 of the transport work is identification information for identifying the type of transport, which is determined corresponding to the transport source and the transport destination. However, the ID information 801 of the transport work may be an ID determined corresponding to the transport source and the transport destination, but the ID information of the transport work may be further classified according to other information such as a material to be transported and a time zone. The stored transport work commands are executed in a predetermined order (for example, in the order from the top of the table).

On the other hand, the information notified from the IoT-GW 104 via a WAN 305 is processed by a data processing unit 501. The data processing unit 501 performs data processing such as header removal of an uplink signal from the WAN communication unit 1201 and data processing such as header addition for transmitting a downlink signal to the WAN communication unit 1201.

An IoT-GW connection information acquisition unit 504 processes the connection time information and the disconnection time information received from the IoT-GW 104. The IoT-GW connection information acquisition unit 504 extracts the information of the IoT-GW, the connection time, and the disconnection time from the notified information and stores the information and the like in an IoT-GW connection time table 505.

In addition, a work information acquisition unit 508 processes the transport completion report received from the IoT-GW 104. The work information acquisition unit 508 extracts the information of the IoT-GW and the transport completion time from the notified information and stores the information and the like in the IoT-GW connection time table 505. In addition, the work information acquisition unit extracts the start time from the transport command generated by the transport work control unit 506 and transmitted to the transport robot 107 and stores the start time in the IoT-GW connection time table 505.

As illustrated in FIG. 6, the IoT-GW connection time table 505 includes ID information 601 of the transport robot, ID information 602 of the IoT-GW as the information notification source, ID information 603 of the transport work (having the same meaning as ID information 801 of the transport work of the transport work table 507), a connection time 604 extracted by the IoT-GW connection information acquisition unit 504, a disconnection time 605 extracted by the IoT-GW connection information acquisition unit 504, a transport start time 606 extracted by the work information acquisition unit 508, and a transport completion time 607 extracted by the work information acquisition unit 508. The information on one row of the IoT-GW connection time table 505 is information generated from one work command, and all the pieces of the information of the connection time 604, the disconnection time 605, the transport start time 606, and the transport completion time 607 may not be stored, but some columns may be blank. For example, in the IoT-GW 901 illustrated in FIG. 11, since the transport start time 606 and the disconnection time 605 are extracted from the transport command 1101, the connection time 604 and the transport completion time 607 are blank.

A representative connection time calculation unit 503 calculates the connection time T based on a time difference of the time information recorded in the IoT-GW connection time table 505. In the case of using the average value as the representative connection time, the average value of the connection time t in a plurality of transport works of the same ID information is calculated. Specifically, if the number of times of executions is denoted by L and the total value of the connection time t of the transport works is denoted by T, the representative connection time can be calculated by T/L. Besides the calculation method of the average value described above, the other calculation methods such as a forgetting average may be used. In addition, the calculation of the representative connection time may be statistical processing other than the averaging. For example, the representative connection time may be calculated by other statistical processing such as a minimum value, a maximum value, or a median value. The calculated representative connection time is stored in the representative connection time table 509.

As illustrated in FIG. 7, the representative connection time table 509 is configured with a main table 701 and a sub table 704. The main table 701 is configured as a matrix by a combination of a transport source 702 and a transport destination 703 for each ID information 801 of the transport work of the transport work table 507. One element corresponding to the combination of the transport source 702 and the transport destination 703 corresponds to the ID information 801 of the transport work. In addition, the elements of the representative connection time table 509 are detailed as illustrated in the sub table 704, and a representative connection time 706 calculated by the representative connection time calculation unit 503 for each IoT-GW 705 passing in the transport work is stored. By storing such information, the representative connection time table 509 can manage the representative connection time of each IoT-GW 104 passing in the transport work. However, in the case of identifying the ID information 801 of the transport work by adding information other than the transport source and the transport destination, the main table 701 has an arrangement of three or more dimensions and is associated with the sub table 704 for each element of the main table 701.

A WAN failure detection unit 510 monitors the connection state to each IoT-GW 104 and determines whether or not a failure has occurred in the WAN 305. The WAN failure detection unit 510 periodically transmits a life-and-death monitoring message such as ping to each IoT-GW and measures the delay time by the time when there is a response from the IoT-GW. In a case where the measured delay time exceeds a threshold value, it is estimated that a WAN failure has occurred, and the fact that the WAN failure has occurred in the IoT-GW is notified to the execution work determination unit 502. The method of detecting the failure may be methods using determination based on the communication delay time between the cloud 101 and each IoT-GW 104, but methods other than those described above may be adopted. For example, in a case where a message in which the response delay time exceeds a threshold value continuously occurs the number of times more than a threshold value, the failure may be detected.

The execution work determination unit 502 refers to the representative connection time table 509, the transport work table 507, and the IoT-GW connection time table 505 to determine the transport work information of not being connected to the IoT-GW 104 in which the failure has occurred in the transport work to be performed from now on.

FIG. 17 is a flowchart of a process executed by the execution work determination unit 502.

In step 1701, based on the determination result of the WAN failure detection unit 510, the execution work determination unit 502 acquires the ID information of the IoT-GW 104 in which the failure has occurred in the WAN 305.

In step 1702, it is determined whether or not there is an IoT-GW 104 recovered from the failure. As described later, the IoT-GW 104 in which the failure has occurred has received, from the cloud 101, the connection refusal command to refuse the connection from the transport robot 107, and thus, the connection refusal state is maintained even after the recovery from the failure, so that the work cannot be performed. Therefore, at the time of failure recovery, in order to execute the operation as usual, the connection refusal state is canceled. In a case where there is an IoT-GW recovered from the failure, the process proceeds to step 1703. In a case where there is no IoT-GW recovered from the failure, the process proceeds to step 1705.

In step 1703, it is determined whether or not the IoT-GW is in a connection refusal state. In a case where the IoT-GW is in the connection refusal state, the process proceeds to step 1704. In a case where the IoT-GW is not in the connection refusal state, the process moves to step 1705.

In step 1704, a cancellation command of the connection refusal to the IoT-GW is generated, and the process proceeds to step 1705.

In step 1705, a process A for determining a transport work to be executed is executed from the determination result as to whether or not a failure has occurred.

FIG. 14 is a flowchart of the process A (step 1705) executed by the execution work determination unit 502.

In step 1401, information on whether or not a failure has occurred and ID information on the IoT-GW in which the failure has occurred are acquired from the WAN failure detection unit 510.

In step 1402, the next transport work information stored in the top of the transport work table 507 is acquired.

In step 1403, in a case it is determined that no failure has occurred in step 1401, since there is no problem in executing the acquired transport work, the process proceeds to step 1410, and the acquired transport work is determined as a final transport work. In a case where it is determined that a failure has occurred, the process proceeds to step 1404.

In step 1404, the representative connection time corresponding to the transport work acquired in step 1402 is extracted from the representative connection time table 509.

In step 1405, it is determined whether or not the transport work acquired in step 1402 passes through the IoT-GW in which the failure has occurred. For example, in the representative connection time table 509 acquired in step 1404, in a case where the representative connection time of the IoT-GW in which the failure has occurred is 0, it is determined that the transport work does not pass through the IoT-GW in which the failure has occurred. In a case of not passing through the IoT-GW in which the failure is occurring, since there is no problem in executing the transport work, the process proceeds to step 1410, and the acquired transport work is determined as a final transport work. In the case of passing through the IoT-GW in which the failure is occurring, the process proceeds to step 1406.

In step 1406, it is determined whether or not the representative connection time of the IoT-GW in which the failure is occurring is equal to or smaller than the threshold value. If it is equal to or smaller than the threshold value, since the time of staying in the failure area is short, it is estimated that the transport work is performed near the failure non-occurrence area. In this case, by maintaining the connection to the IoT-GW in the failure non-occurrence area, there is a possibility that the transport work can be executed without connection to the IoT-GW in which the failure is occurring. Therefore, in order not to be connected to the IoT-GW in which the failure is occurring, the process proceeds to step 1408. In a case where the representative connection time is larger than the threshold value, since the time of staying in the failure area is long, it is estimated that the transport robot move to a place far from the failure non-occurrence area. In this case, when the transport work is executed, since it is estimated that the transport robot is connected to the IoT-GW in which the failure is occurring and moves to the failure area, the extracted work is not performed, and the process proceeds to step 1407.

In step 1407, a content of the transport work in a case where the work extracted in step 1402 is not executed is determined. Since the method of determining the content of the transport work depends on the production process and the manufacturing policy of the factory, various methods may be applied as long as the method determines the next work content in a case where the work is not executed. For example, referring to the transport work table 507, the next transport work may be executed. Alternatively, in a case where the transport work is important, the transport work may be executed after waiting for a fixed time. By doing this, the work of the transport robot moving to the failure area is detected, and the intrusion into the failure area is minimized, so that it is possible to prevent the transport robot from stagnating and suppress the deterioration of the production efficiency.

In step 1408, it is assumed that the representative connection time is equal to or smaller than the threshold value and the transport work can be maintained by maintaining the connection to the IoT-GW in which no failure has occurred. Therefore, since the transport robot 107 maintains the connection to the IoT-GW in which no failure has occurred, a connection refusal command for not connecting the IoT-GW in which a failure is occurring to the transport robot 107 is generated. In this case, the transport robot 107 is instructed to perform the transport work extracted in step 1402.

However, if the IoT-GW in which a failure is occurring continues refusing the connection permanently, in a case where the IoT-GW moves to the failure area and the connection to the IoT-GW in which no failure has occurred cannot be maintained, since the IoT-GW cannot be connected to any IoT-GW, it is referred to as a command to refuse the connection to the IoT-GW during the occurrence of the failure for a certain period of time until the transport work is ended or the IoT-GW is passed is set. The time of refusing the connection may be set in consideration of a margin in the representative connection time. For example, in a case where the representative connection time is set to 3 seconds and the margin is doubled, a command to refuse the connection request is generated for 6 seconds after the connection request is notified from the transport robot to the IoT-GW.

In step 1410, the transport work (for example, the transport work extracted in step 1402 or the transport work determined in step 1407) extracted in the processes up to step 1410 is determined as the transport work which is to be instructed to the transport robot 107.

In step 1411, the determined transport work is instructed from the cloud 101 to the transport robot 107 and is executed by the transport robot 107, so that the determined transport work is deleted from the transport work table 507.

In the above-described flow, in step 1408, since the connection to the IoT-GW in which the failure is occurring is not established, the connection time is different from the connection time in the transport work in the normal state. It is desirable that the representative connection time holds the value at the time of failure no-occurrence, and thus, when executing step 1408, it is preferable not to measure the representative connection time.

The transport work determined by the execution work determination unit 502 is notified to the data processing unit 501 and notified to the transport robot 107 via the WAN. In addition, the connection refusal command generated by the execution work determination unit 502 is notified to the data processing unit 501 and notified to the IoT-GW 104 via the WAN.

In step 1406, it may not be determined whether or not the representative connection time of the IoT-GW in which the failure is occurring is equal to or smaller than the threshold value. In this case, with respect to all the transport works passing through the IoT-GW in which the failure is occurring, the content of the transport work in a case where the extracted work is not executed may be determined in step 1407. That is, the transmission of the instruction of the transport work to the transport robot 107 passing through the IoT-GW in which the failure is occurring is stopped. Then, the transport work which has not been executed may be extracted again after a predetermined time elapses, and it may be determined whether or not execution is possible depending on whether or not the failure has been resolved.

FIG. 18 illustrates a sequence after the execution work determination unit 502 has determined the transport work.

When the execution work determination unit 502 generates at least one of a transport command to be executed and a connection refusal command (1801), a connection refusal command 1802 is transmitted to the corresponding IoT-GW 104, and a transport command 1803 is notified to the transport robot 107. After notifying the transport robot 107 of the transport work, the sequence illustrated in FIGS. 11 and 13 is executed.

FIG. 4 is a functional block diagram illustrating an operation using the above-described connection refusal command in the IoT-GW 104 according to Embodiment 1.

A data processing unit 406 performs processing such as header removal on the information received from the cloud 101 by the WAN communication unit 303 and transmits the information to a functional block that performs internal processing or the FAN communication unit 304. In addition, the data processing unit performs processing such as header addition on the information generated inside the IoT-GW 104 and the information transmitted from the transport robot 107 and transmits the information to the WAN communication unit 303. In addition, the data processing unit performs processing such as header removal on the information received from the transport robot 107 by the FAN communication unit 304 and transmits the information to a functional block that performs internal processing or the WAN communication unit 303. The connection refusal command received from the cloud 101 by the WAN communication unit 303 is subjected to processes such as header removal in the data processing unit 406 and stored in an access information table 401.

As illustrated in FIG. 15, the access information table 401 is configured with ID information 1501 of the transport robot and a connection refusal time 1502 of refusing the connection from each transport robot. The transport robot having the connection refusal time 1502 of 0 indicates that the connection is not refused and the connection is permitted.

The FAN access refusal determination unit 403 determines whether or not to refuse the access from the transport robot 107 at the current time. Since the connection from the transport robot 107 of which the connection refusal time 1502 of the access information table 401 is 0 is not refused, no process is particularly performed. On the other hand, the FAN access refusal determination unit 403 notifies the FAN communication unit 304 of a command to refuse the connection from the transport robot 107 of which the connection refusal time 1502 is not 0. In addition, when the connection refusal time elapses after notifying the FAN communication unit 304 of the access refusal, the FAN access refusal determination unit 403 notifies the FAN communication unit 304 of cancellation of the access refusal.

On the other hand, the IoT-GW 104 notifies the cloud 101 of the connection time information and the disconnection time information of the transport robot 107. A device information acquisition unit 404 acquires the time at which the transport robot 107 connected and disconnected to and from the IoT-GW 104 and stores the time in a device information table 402.

As illustrated in FIG. 19, the device information table 402 is configured with ID information 1901 of the transport robot, connection time information 1902, and disconnection time information 1903. In some cases, both the connection time and the disconnection time may not be stored, only the disconnection time may be stored, only the connection time may be stored, and both the disconnection time and the connection time may be blank.

After storing the connection time or the disconnection time of the transport robot 107 in the device information table 402, the device information acquisition unit 404 refers to the device information table 402, acquires the connection time and the disconnection time of the transport robot 107, and transmits the connection time and the disconnection time to the data processing unit 406 for notification to the cloud 101. However, the timing at which the device information acquisition unit 404 acquires the connection time and the disconnection time may be a timing other than when the transport robot 107 is connected or disconnected, as long as the connection time and the disconnection time of the transport robot 107 can be acquired. For example, the device information table 402 may be referred to repeatedly at a predetermined timing (at certain time intervals).

FIG. 16 is a sequence diagram in FIG. 9 after a failure has occurred in the IoT-GW 902, a transport work moving from x_1 to x_2 occurs, the representative connection time of the IoT-GW 902 is determined to be equal to or smaller than the threshold value, and the connection refusal command is notified from the cloud 101 to the IoT-GW 902.

In step 1601, the transport work from x_1 to x_2 occurs in the cloud 101, and in step 1602, it is determined that connection refusal of the IoT-GW 902 is necessary, and a connection refusal command 1603 is notified from the cloud 101 to the IoT-GW 902.

After that, the cloud 101 transmits a transport command 1604 to the transport robot 107, and the transport robot 107 moves from x_1 to x_2 (1605).

In the case of moving from x_1 to x_2, the transport robot 107 disconnects from the IoT-GW 901 (1606) and attempts to be connected to the IoT-GW 902 (1607). However, since the IoT-GW 902 receives the connection refusal command from the cloud 101, the connection request from the transport robot 107 is refused (1608).

The transport robot 107 of which the connection request has been refused attempts to be connected to another IoT-GW, and in this case, the transport robot requests re-connection to the closest IoT-GW 901 (1609). In a case where the representative connection time to the IoT-GW 902 is a short time equal to or smaller than the threshold value, it is assumed that the transport robot exists at a location near the IoT-GW 901, so that there is a high possibility that the transport robot 107 can receive a radio wave from the IoT-GW 901. For this reason, even if there is intrusion into the failure area, communication with the IoT-GW 901 can be continued and the transport work can be completed.

In the present embodiment, as illustrated in FIG. 1, the example in which the IoT-GW 104 is connected to the cloud 101 via the WAN 305 has been described. However, if the server 109 controls the transport robot 107, the server 109 installed at the site rather than the cloud 101 may control the transport robot 107. In this case, the WAN 305 may be an intra-factory network.

In the above description, the connection refusal information may not be transmitted to the IoT-GW 104, but connection disable information may be transmitted to the transport robot 107. In this case, the connection disable information may include identification information of the IoT-GW 104 in the wireless communication system adopted in the FAN (an SSID if the IoT-GW 104 is an access point of the wireless LAN). Then, without connection to the IoT-GW 104 of the identification information included in the received connection disable information at the connection refusal time, the transport robot 107 is connected to the original IoT-GW 104 and performs the transport work.

As described above, in the system according to the embodiment of the present invention, the control device (cloud 101) includes the transport work control unit 506 that transmits the movement control instruction to the mobile device (transport vehicle 107), the WAN failure detection unit 510 that determines whether or not a failure has occurred in communication between the cloud 101 and the gateway device (IoT-GW 104), and the execution work determination unit 502 that determines whether or not the movement control instruction executed by the mobile vehicle 107 passes through the IoT-GW 104 in which the failure determined by the WAN failure detection unit 510 has occurred and stops transmission of the movement control instruction of passing through the IoT-GW 104 in which the failure has occurred to the transport vehicle 107, so that it is possible to reduce an influence of the failure area and to suppress a decrease in work efficiency of the field apparatuses.

In addition, the IoT-GW 104 includes the device information acquisition unit 404 that reports the connection time and the disconnection time with respect to the transport vehicle 107 to the cloud 101 and the FAN access refusal determination unit 403 that refuses the connection of the transport vehicle 107 in a case of receiving the instruction to refuse the connection of the transport vehicle 107 from the cloud 101, the cloud 101 includes the representative connection time calculation unit 503 that calculates the representative connection time corresponding to the type of the movement control instruction based on the time when the movement control instruction is being executed during the connection between the transport vehicle 107 and the IoT-GW 104, and the execution work determination unit 502 transmits the refusal instruction to refuse the connection to the transport vehicle 107 to the IoT-GW 104 in which the failure has occurred in a case where the representative connection time is equal to or smaller than the threshold value, so that it is possible to estimate a degree of an influence of the failure area and to minimize the influence of the failure.

In addition, in a case of passing through the IoT-GW 104 in which the failure has occurred and in a case where the representative connection time is equal to or smaller than the threshold value, the execution work determination unit 502 transmits the movement control instruction to the transport vehicle 107, and in a case of passing through the IoT-GW 104 in which the failure has occurred and in a case where the representative connection time is larger than the threshold value, the execution work determination unit 502 does not transmit the movement control instruction to the transport vehicle 107 but transmits another movement control instruction to the transport vehicle 107, so that, in a case of passing through the IoT-GW 104 in which the failure has occurred, it is possible to estimate whether or not to move to a location close to the IoT-GW in which no failure has occurred, and thus, it is possible to reduce an influence of the failure area and to suppress a decrease in work efficiency of the field apparatuses.

In addition, the execution work determination unit 502 determines the refusal time of refusing the connection between the transport vehicle 107 and the IoT-GW 104 based on the representative connection time and transmits the refusal instruction including the determined refusal time to the IoT-GW 104, and upon receiving the refusal instruction, the IoT-GW 104 refuses the connection to the transport vehicle 107 in the refusal time, so that the connection is refused for only an appropriate period of time, and thus, it is possible to suppress the state where the work cannot be performed after the recovery from the failure. In addition, it is unnecessary to install a special function in the transport vehicle 107.

In addition, in a case where the IoT-GW 104 has transmitted the movement control instruction and the completion report, the representative connection time calculation unit 503 calculates a statistical value of the difference between the time of the movement control instruction and the time of the completion report as the representative connection time, so that, even in a case where the IoT-GW 104 is not switched, it is possible to accurately calculate the representative connection time.

In addition, in a case where the IoT-GW 104 has transmitted the movement control instruction and another IoT-GW 104 has transmitted the completion report, the representative connection time calculation unit 503 calculates a statistical value of the difference between the time of the movement control instruction and the disconnection time of the transport vehicle 107 as the representative connection time, so that, even in a case where the IoT-GW 104 is switched to another IoT-GW 104, it is possible to accurately calculate the representative connection time.

In addition, in a case where another IoT-GW 104 has transmitted the movement control instruction and the gateway device has transmitted the completion report, the representative connection time calculation unit 503 calculates a statistical value of the difference between the connection time of the transport vehicle 107 and the time of the completion report as the representative connection time, so that, even in a case where the IoT-GW 104 is switched from the other IoT-GW 104, it is possible to accurately calculate the representative connection time.

In addition, in a case where the IoT-GW 104 has not transmitted both the movement control instruction and the completion report, the representative connection time calculation unit 503 calculates a statistical value of the difference between the connection time of the transport vehicle 107 and the disconnection time of the transport vehicle 107 as the representative connection time, so that, even in a case where the IoT-GW 104 is switched, it is possible to accurately calculate the representative connection time.

In addition, the execution work determination unit 502 determines the refusal time of refusing the connection between the transport vehicle 107 and the IoT-GW 104 based on the representative connection time and transmits the connection disable instruction including the determined refusal time to the transport vehicle 107, and upon receiving the connection disable instruction, the transport vehicle 107 stops the connection to the IoT-GW 104 in the refusal time, so that the connection is refused for only an appropriate period of time, and thus, it is possible to suppress the state where the work cannot be performed after the recovery from the failure. In addition, there is no need to install a special function in the IoT-GW 104.

In addition, the representative connection time calculation unit 503 distinguishes the movement control instruction by a combination of the movement source and the movement destination and calculates the representative connection time corresponding to a type of the distinguished movement control instruction, so that it is possible to accurately calculate the representative connection time.

In a case where the communication delay time with respect to the IoT-GW 104 is equal to or larger than a threshold value, the WAN failure detection unit 510 determines that the failure has occurred, so that it is possible to accurately determine the occurrence of the failure in the WAN.

In addition, the present invention is not limited to the above-described embodiments, but includes various modifications and equivalent configuration within the scope of the appended claims. For example, the above-described embodiments have been described in detail in order to explain the present invention in an easy-to-understand manner, and the present invention is not necessarily limited to those having all the configurations described. In addition, a portion of the configuration of an embodiment may be replaced with the configuration of another embodiment. In addition, the configuration of another embodiment may be added to the configuration of one embodiment. In addition, other configurations may be added, deleted, or replaced with respect to a portion of the configuration of each embodiment.

In addition, the above-described configurations, functions, processing units, processing means, and the like may be realized by hardware, for example, by designing some or all of the above-described configurations, functions, processing units, processing means, and the like with integrated circuits or the like or may be realized by software by a processor interpreting a program realizing the respective functions and executing the program.

Information of programs, tables, files, and the like that realize each function can be stored in a storage device such as a memory, a hard disk, or an SSD (Solid State Drive) or a recording medium such as an IC card, an SD card, or a DVD.

In addition, control lines and information lines indicate what is considered to be necessary for the description but do not necessarily indicate all control lines and information lines necessary for mounting. In fact, it may be considered that almost all configurations are connected to each other.

The invention claimed is:

1. A system for controlling a mobile device, comprising:
a plurality of gateway devices that respectively provide a plurality of wireless communication areas to the mobile device; and
a control device that is connected to the gateway devices and controls the mobile device, wherein
the mobile device reports a completion report indicating completion of a movement work according to a movement control instruction from the control device to the control device, and
wherein the control device includes a memory which stores:
a representative connection time table which holds a plurality of representative connection times in association with the gateway devices, the representative connection time table corresponding to movement through the communication areas from a movement source to a movement destination,
wherein the control device includes a processor programmed to:
determine whether or not a failure has occurred in communication between the control device and a respective gateway device among the gateway devices,
upon determining the failure has occurred in communication between the control device and the respective gateway device, determine whether or not the movement control instruction, to instruct the mobile terminal to move from the movement source to the movement destination, will cause the mobile terminal to pass through the communication area of the respective gateway device,
upon determining the movement control instruction will cause the mobile terminal to pass through the communication area of the respective gateway device, determine whether or not the representative connection time associated with the respective gateway device is equal to or less than a threshold value,
upon determining the representative connection time associated with the respective gateway device is equal to or less than the threshold value, transmit a connection refusal command to the respective gateway device which prevents the respective gateway from connecting to the mobile terminal and transmit the movement control instruction to the mobile device to cause the mobile terminal to begin to move from the movement source to the movement destination.

2. The system according to claim 1, wherein
each of the gateway devices respectively includes a processor programmed to:
report a connection time and a disconnection time with respect to the mobile device to the control device; and
refuse connection of the mobile device in a case of receiving the connection refusal command from the control device,
wherein the processor of the control device is programmed to:
calculate the representative connection times of the representative connection time table based on the reported connection time and the reported disconnection time from each of the gateway devices.

3. The system according to claim 2, wherein
the processor of the control device is programmed to:
upon determining the representative connection time associated with the respective gateway device is not equal to or less than the threshold value, not transmit the movement control instruction to the mobile device.

4. The system according to claim 2, wherein
the processor of the control device is programmed to:
upon determining the representative connection time associated with the respective gateway device is equal to or less than the threshold value, determine a refusal time for refusing connection between the mobile device and the respective gateway device based on the representative connection time associated with the respective gateway device, and transmit the connection refusal command which includes the refusal time to the respective gateway device, and
the processor of the respective gateway device is programmed to:
upon receiving the connection refusal command, refuse connection to the mobile device for the refusal time.

5. The system according to claim 1, wherein
the processor of the control device is programmed to:
receive the completion report from the mobile device indicating completion of movement according to the movement control instruction,
calculate a statistical value of a difference between a time of the movement control instruction and a time of the completion report as the representative connection time in a case where the respective gateway device has transmitted the movement control instruction and the completion report;
calculate a statistical value of a difference between a time of the movement control instruction and a disconnection time of the mobile device as the representative connection time in a case where the respective gateway device has transmitted the movement control instruction and another one of the gateway devices has transmitted the completion report;

calculate a statistical value of a difference between a connection time of the mobile device and a time of the completion report as the representative connection time in a case where another one of the gateway devices has transmitted the movement control instruction and the respective gateway device has transmitted the completion report; and calculate a statistical value of a difference between a connection time of the mobile device and a disconnection time of the mobile device as the representative connection time in a case where the respective gateway device has not transmitted the movement control instruction and has not transmitted the completion report.

6. The system according to claim 2, wherein
the processor of the control device is programmed to:
upon determining the representative connection time associated with the respective gateway device is equal to or less than the threshold value, determine a refusal time of refusing connection between the mobile device and the gateway device based on the representative connection time associated with the respective gateway device, and transmit a connection disable command which includes the refusal time to the mobile device, and
the mobile device includes a processor programmed to:
upon receiving the connection disable command, the mobile device does not connect to the respective gateway device for the refusal time.

7. The system according to claim 2, wherein
the processor of the control device is programmed to:
distinguish the movement control instruction by a combination of the movement source and the movement destination; and
calculate the representative connection time corresponding to a type of the movement control instruction.

8. The system according to claim 2, wherein
the processor of the control device is programmed to:
upon determining a communication delay time with the respective gateway device is equal to or larger than the threshold value, determine that the failure has occurred.

9. A control device controlling a mobile device, wherein
the control device is connected to a plurality of gateway devices that respectively provide a plurality of wireless communication areas to the mobile device,
the control device comprising:
a memory that stores a representative connection time table which holds a plurality of representative connection times in association with the gateway devices, the representative connection time table corresponding to movement through the communication areas from a movement source to a movement destination; and
a processor programmed to:
determine whether or not a failure has occurred in communication between the control device and a respective gateway device among the gateway devices,
upon determining the failure has occurred in communication between the control device and the respective gateway device, determine whether or not a movement control instruction, to instruct the mobile terminal to move from the movement source to the movement destination, will cause the mobile terminal to pass through the communication area of the respective gateway device, upon determining the movement control instruction will cause the mobile terminal to pass through the communication area of the respective gateway device, determine whether or not the representative connection time associated with the respective gateway device is equal to or less than a threshold value, upon determining the representative connection time associated with the respective gateway device is equal to or less than the threshold value, transmit a connection refusal command to the respective gateway device which prevents the respective gateway from connecting to the mobile terminal and transmit the movement control instruction to the mobile device to cause the mobile terminal to begin to move from the movement source to the movement destination.

10. The control device according to claim 9, wherein
the processor is programmed to:
upon determining the representative connection time associated with the respective gateway device is not equal to or less than the threshold value, not transmitting the movement control instruction to the mobile device.

11. A control method executed in a system for controlling a mobile device,
the system including a control device connected to a plurality of gateway devices that respectively provide a plurality of wireless communication areas to the mobile device and the control device controls the mobile device, and
the control device stores a representative connection time table which holds a plurality of representative connection times in association with the gateway devices, the representative connection time table corresponding to movement through the communication areas from a movement source to a movement destination,
the control method comprising:
determining, by the control device, whether or not a failure has occurred in communication between the control device and a respective gateway device among the gateway devices;
upon determining the failure has occurred in communication between the control device and the respective gateway device, determining whether or not a movement control instruction, to instruct the mobile terminal to move from the movement source to the movement destination, will cause the mobile terminal to pass through the communication area of the respective gateway device,
upon determining the movement control instruction will cause the mobile terminal to pass through the communication area of the respective gateway device, determining whether or not the representative connection time associated with the respective gateway device is equal to or less than a threshold value,
upon determining the representative connection time associated with the respective gateway device is equal to or less than the threshold value, transmitting a connection refusal command to the respective gateway device which prevents the respective gateway from connecting to the mobile terminal and transmitting the movement control instruction to the mobile device to cause the mobile terminal to begin to move from the movement source to the movement destination.

12. The control method according to claim 11, further comprising:
upon determining the representative connection time associated with the respective gateway device is not equal to or less than the threshold value, not transmitting the movement control instruction to the mobile device.

\* \* \* \* \*